T. Dow.
Plow Clevis.

N° 94,290.  Patented Aug. 31, 1869.

Witnesses
E. W. Dow
E. H. Ldue

Inventor
Thomas Dow
By his Attorney
C. A. Chopin

UNITED STATES PATENT OFFICE.

THOMAS DOW, OF YORKTOWN, ILLINOIS.

IMPROVEMENT IN PLOW-CLEVISES.

Specification forming part of Letters Patent No. 94,296, dated August 31, 1869.

*To all whom it may concern:*

Be it known that I, THOMAS DOW, of Yorktown, in the county of Bureau and State of Illinois, have invented an Improved Adjustable Plow-Clevis; and I do hereby declare that the following is a full, clear, and exact description thereof, which will enable others skilled in the art to make and use the same, reference being had to the accompanying drawings and letters marked thereon, making a part of this specification, in which—

Figure 1:
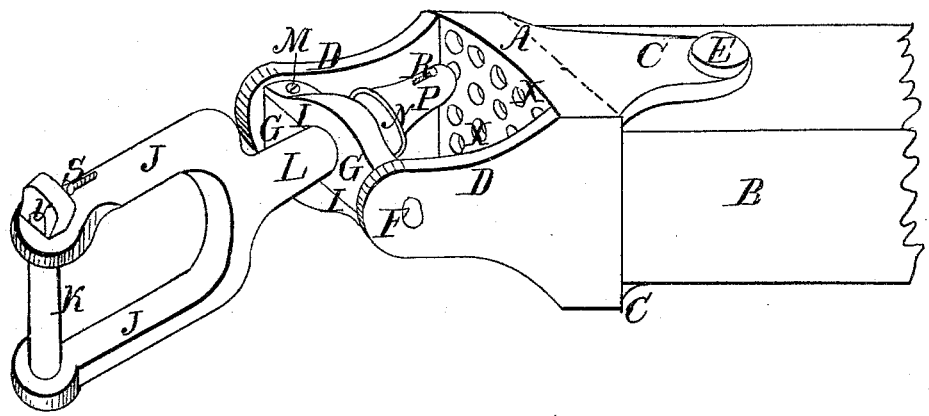
Figure 2:
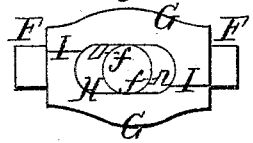
Figure 3:
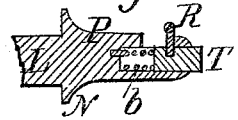

Figure 1 is a perspective representation of my invention; Fig. 2, an elevation of the two-part roller which sustains the draft of the plow; Fig. 3, a section of the end of the clevis-shank, showing the spring-catch which holds it to the concave plate.

The nature of the present invention consists in providing the clevis with a shank, which passes through a slotted roller and locks at any desired angle into a concave plate fastened to the end of the plow-beam, as the whole is hereinafter fully described.

J J represent the prongs of a clevis, which are provided with a shank, L P, as shown at Fig. 1. That part of the shank shown at L is arranged to rotate in a two-part roller, G G, and the part P is provided with a flange, N, to hold the clevis in place, and with a spring, T, Fig. 3, to hold the clevis at any desired angle relative to a beam, B. This adjustment is made by means of a series of holes, X X, made in a concave plate, A, in either of which the spring-bolt T may be put by simply drawing back on a knob, R, Figs. 1 and 3, attached to the bolt, and operating in a slot formed in the shank part P, each hole in plate A being the same distance from the pivot-point of the shank in the roller G G. The plate A is provided with lugs C C for fastening it to the beam B, and with lugs D D for supporting the bearings F F of the roller G G. This roller has a peculiar construction, as shown at Fig. 2, it being made in two parts for the convenience of putting in the shank part L, and divided on opposite sides of the bearings F F, tongued and grooved together, as shown at *f f*, and the parts fastened by screws M. Its inner side, adjoining the collar or flange N, is slotted out, as shown at H, in order that the clevis J J may be set at any desired angle with the beam B in a horizontal plane, the roller G G allowing the clevis to have an angle in a vertical plane. The upper prong J of the clevis is provided with a spring-bolt, which is similar in construction to the spring-bolt T, and which locks into a hole, *v*, Fig. 1, in the top of a pin, K, and thus holds the pin in the prongs and prevents an evener from being easily detached.

By means of this construction and arrangement a clevis attachment is provided which is simple and durable, and if made of malleable iron will be cheap.

Having thus described my invention, what I claim, and desire to secure by Letters Patent of the United States, is—

The concave plate A, provided with holes X and lugs C and D, in combination with the two-part roller G G, clevis J J, provided with shank L P, flange N, and spring-bolt T, constructed and arranged to operate as and for the purpose set forth.

THOS. DOW.

Witnesses:
E. W. DOW,
E. A. LADUE.